(12) United States Patent
Rekin et al.

(10) Patent No.: US 12,258,817 B2
(45) Date of Patent: Mar. 25, 2025

(54) THREAD CONNECTION FOR CASINGS

(71) Applicant: PAO "TMK", Moscow (RU)

(72) Inventors: Sergey Alexandrovich Rekin, Moscow (RU); Maxim Evgenievich Tyuldin, Moscow (RU); Pavel Nikolaevich Sidorenko, Taganrog (RU); Maxim Nikolaevich Kruchkov, Taganrog (RU)

(73) Assignee: PAO "TMK", Moscow (RU)

( * ) Notice: Subject to any disclaimer, the term of this patent is extended or adjusted under 35 U.S.C. 154(b) by 195 days.

(21) Appl. No.: 18/013,031

(22) PCT Filed: Jun. 29, 2020

(86) PCT No.: PCT/RU2020/000314
§ 371 (c)(1),
(2) Date: Dec. 27, 2022

(87) PCT Pub. No.: WO2022/005319
PCT Pub. Date: Jan. 6, 2022

(65) Prior Publication Data
US 2023/0243219 A1    Aug. 3, 2023

(51) Int. Cl.
*F16L 17/04*      (2006.01)
*E21B 17/042*    (2006.01)
*F16L 15/06*      (2006.01)

(52) U.S. Cl.
CPC ............ *E21B 17/042* (2013.01); *F16L 15/06* (2013.01)

(58) Field of Classification Search
CPC .......... F16L 15/04; F16L 15/06; E21B 17/042
See application file for complete search history.

(56) References Cited

U.S. PATENT DOCUMENTS

| 4,384,737 | A | * | 5/1983 | Reusser | E21B 17/042 |
|---|---|---|---|---|---|
| | | | | | 285/369 |
| 5,137,310 | A | | 8/1992 | Noel | |
| 5,769,466 | A | | 6/1998 | Noel | |
| 7,334,821 | B2 | * | 2/2008 | Dutilleul | E21B 17/042 |
| | | | | | 285/333 |

(Continued)

FOREIGN PATENT DOCUMENTS

RU      2639343      12/2017

*Primary Examiner* — David Bochna
(74) *Attorney, Agent, or Firm* — Aleksandr Smushkovich

(57) ABSTRACT

A thread connection for casings used for construction of vertical, directional and horizontal wells. The connection includes male and female elements, whose ends, both externally and internally, are produced correspondingly with tapered trapezoidal threads, sealing, transition and shoulder end surfaces. Crests and roots of the thread turn profile are parallel to the axial line of thread. Additional surfaces are formed as a taper surface on the female element and a taper surface or convex spherical surface on the male element. Transition from the sealing surfaces to additional surfaces are formed as concave spherical surface on the male element and of convex spherical surface on the female element. High tightness of the connection under sufficient mechanical loads is achieved by improving characteristics of the connection make-up, prevention of jamming of the connection at the initial stage of make-up, lack of damages (galling) of sealing surfaces.

18 Claims, 4 Drawing Sheets

(56) References Cited

U.S. PATENT DOCUMENTS

| | | | | |
|---|---|---|---|---|
| 8,894,101 | B2* | 11/2014 | Pallini, Jr. | E21B 17/042 |
| | | | | 285/333 |
| 2012/0133129 | A1* | 5/2012 | Hignett | E21B 17/042 |
| | | | | 285/339 |
| 2019/0056049 | A1* | 2/2019 | Kawai | E21B 17/042 |
| 2019/0360619 | A1* | 11/2019 | Maruta | E21B 17/042 |
| 2020/0370683 | A1* | 11/2020 | Glukhih | E21B 17/042 |
| 2022/0127911 | A1* | 4/2022 | Wickander | E21B 17/042 |

* cited by examiner

THREAD CONNECTION FOR CASINGS

CROSS-REFERENCE TO RELATED APPLICATIONS

This application is a U.S. national stage application of an international application PCT/RU2020/000314 filed on 29 Jun. 2020, published as WO/2022/005319.

FIELD OF THE INVENTION

The claimed invention refers to coupling thread connections for casings and can be applied for joining of the string elements, used for construction of vertical, directional and horizontal wells at oil, gas, gas-condensate fields.

BACKGROUND OF THE INVENTION

The casings for the oil, gas and gas-condensate wells are exploited under complicated conditions—at sufficient multidirectional combined mechanical loads (tension, compression, bending, torsion). Considering the abovementioned the main requirement for thread connections for casing is preservation of tightness including gas tightness at high levels of mechanical loads.

In addition, taking into consideration assembly of thread connections for casing in the field, the thread connections shall have high characteristics of make-up-speed and easiness of make-up and break-out, reliable alignment, stabilization of elements of the thread connection relative to each other, withstanding of multiple cycles of make-up/break-out without damages observed on contact surfaces of thread, seal and shoulder end surfaces.

The prior art discloses the thread connection for casing containing male and female elements, the ends of which, both externally and internally, are produced correspondingly with tapered trapezoidal threads, sealing and shoulder end surfaces which make an internal sealing unit.

Tapered trapezoidal threads of male and female elements are produced with the crests and roots of thread turn profile, parallel to axial line of thread. Sealing surfaces on male and female elements are produced in the form of spherical surfaces, concave and convex correspondingly (RU 2639343 C1, 21.12.2017 (1).

The thread connection for casing disclosed in document (1) does not ensure tightness (in particular gas tightness) of the connection under the influence of multidirectional combined mechanical loads. Jamming of the connection at the initial stage of make-up, damage (galling) of the connection sealing surfaces during operation, under the influence of mechanical loads of high level, lead to loss of tightness of the connection.

This engineering solution (1) is made to provide the closest analog to the claimed invention.

BRIEF SUMMARY OF THE INVENTION

The technical result provided with the claimed invention, is preservation of high tightness of the connection being affected by sufficient multidirectional mechanical combined loads, the technical result is achieved by means of improved characteristics of the connection make-up—prevention of jamming of the connection at the initial stage of make-up, lack of damages (galling) of sealing surfaces.

The thread connection for casings contains male and female elements, the ends of which, both externally and internally, are produced correspondingly with tapered trapezoidal threads, and sealing and shoulder end face surfaces which make an internal sealing unit. Crests and roots of threads turn profile of male and female elements are produced with parallel to axial line of thread. Internal sealing unit is equipped with additional surfaces located between sealing and shoulder end face surfaces.

The additional surfaces are produced in the form of taper surface on the female element and of taper surface or convex spherical surface on the male element.

Transition from sealing surfaces to additional surfaces are produced in the form of concave spherical surface on the male element and of convex spherical surface on the female element.

In the particular case of design of the claimed invention the trapezoidal threads of male and female elements are produced with the taper 1:18.

In the particular case of design of the claimed invention the trapezoidal threads of male and female elements are produced with the taper 1:12.

In the particular case of design of the claimed invention the trapezoidal threads of male and female elements are produced with the taper 1:8.

In the particular case of design of the claimed invention the trapezoidal tapered threads of male and female elements are produced with the pitch of 8,467 mm.

In the particular case of design of the claimed invention the trapezoidal tapered threads of male and female elements are produced with the pitch of 5.08 mm.

In the particular case of design of the claimed invention the trapezoidal tapered threads of male and female elements are produced with the slope angle of turn profile stab flank of 13-17° to thread axis normal line.

In the particular case of design of the claimed invention the trapezoidal tapered threads of male and female elements are produced with the slope angle of turn profile load flank from −3 to −7° to thread axis normal line.

In the particular case of design of the claimed invention shoulder end face surfaces of male and female elements are produced at an angle of 8-12° to thread axis normal line.

In the particular case of design of the claimed invention sealing surfaces of male and female elements are performed tapered with the slope angle from 11-14° to thread axis normal line.

In the particular case of design of the claimed invention sealing surfaces are produced in the form of convex spherical surface with the radius of 125-200 mm on the male element and in the form of taper surface with the slope angle of 11-14° to thread axial line on the female.

In the particular case of design of the claimed invention transition from the crest to stab flank of thread turn profile of male and female elements are produced in the form of complex surface consisted of two spherical surfaces, having different radii R1 and R2.

In the particular case of design of the claimed invention the radius of spherical surface, adjacent to the crest of thread turn profile of male and female elements is equal to 0.2-0.5 mm, and the radius of spherical surface adjacent to stab flank of threads turn profile of male and female elements is equal to 1.1-1.3 mm.

In the particular case of design of the claimed invention the additional surfaces are produced in the form of a tapered surfaces with the slope angle of 3-6° to axial line of thread on the male and female element.

In the particular case of design of the claimed invention the additional surfaces are produced in the form of a convex spherical surface with the radius of 90-100 mm on the male element and in the form of a tapered surface with the slope angle of 3-6° to axial line of thread on the female element.

In the particular case of design of the claimed invention the concave spherical surface between the sealing surface and the additional surface of the male element is produced with the radius of 3-5 mm.

In the particular case of design of the claimed invention the convex spherical surface between the sealing surface and the additional surface of the female element is produced with the radius of 6-8 mm.

DETAILED DESCRIPTION OF THE INVENTION

Figure 1:
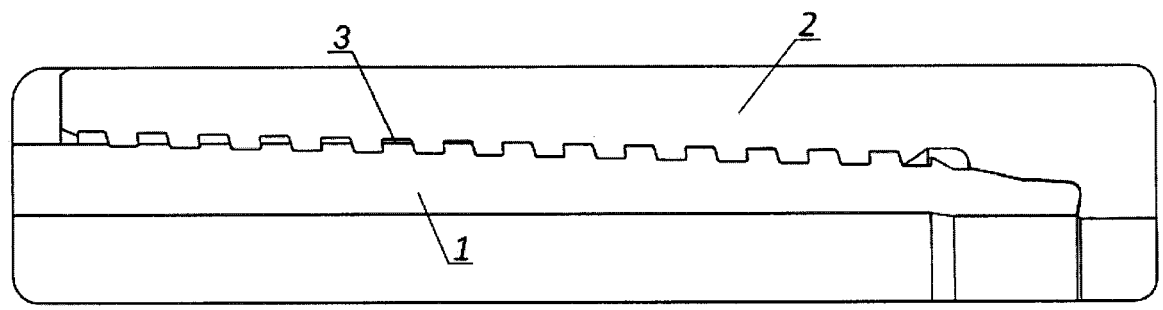
FIG. 1 shows the claimed thread connection for casings made-up.
Figure 2:
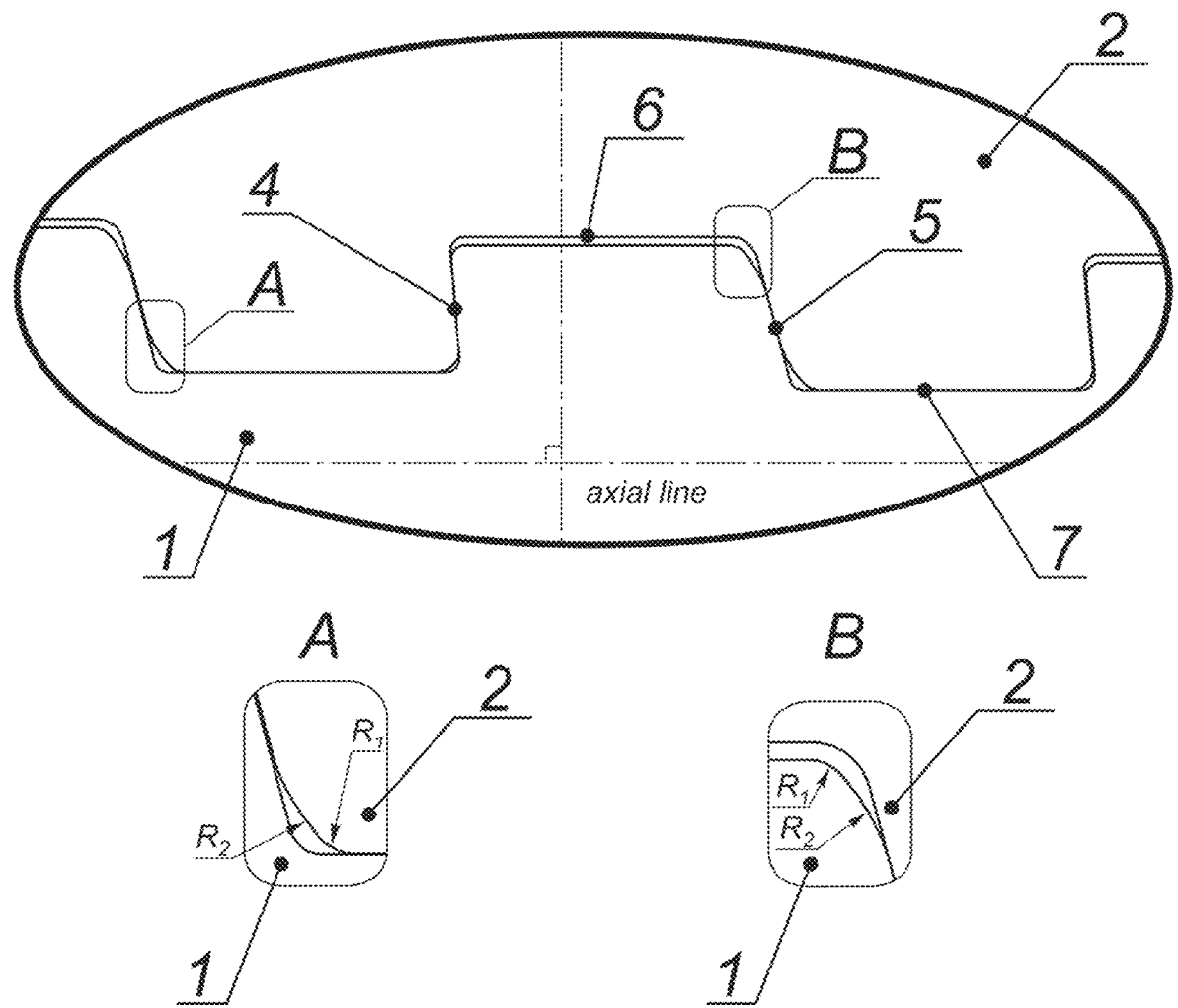
FIG. 2 shows the turn profile of the claimed thread connection, including two enlarged partial views A and B.
Figure 3A:
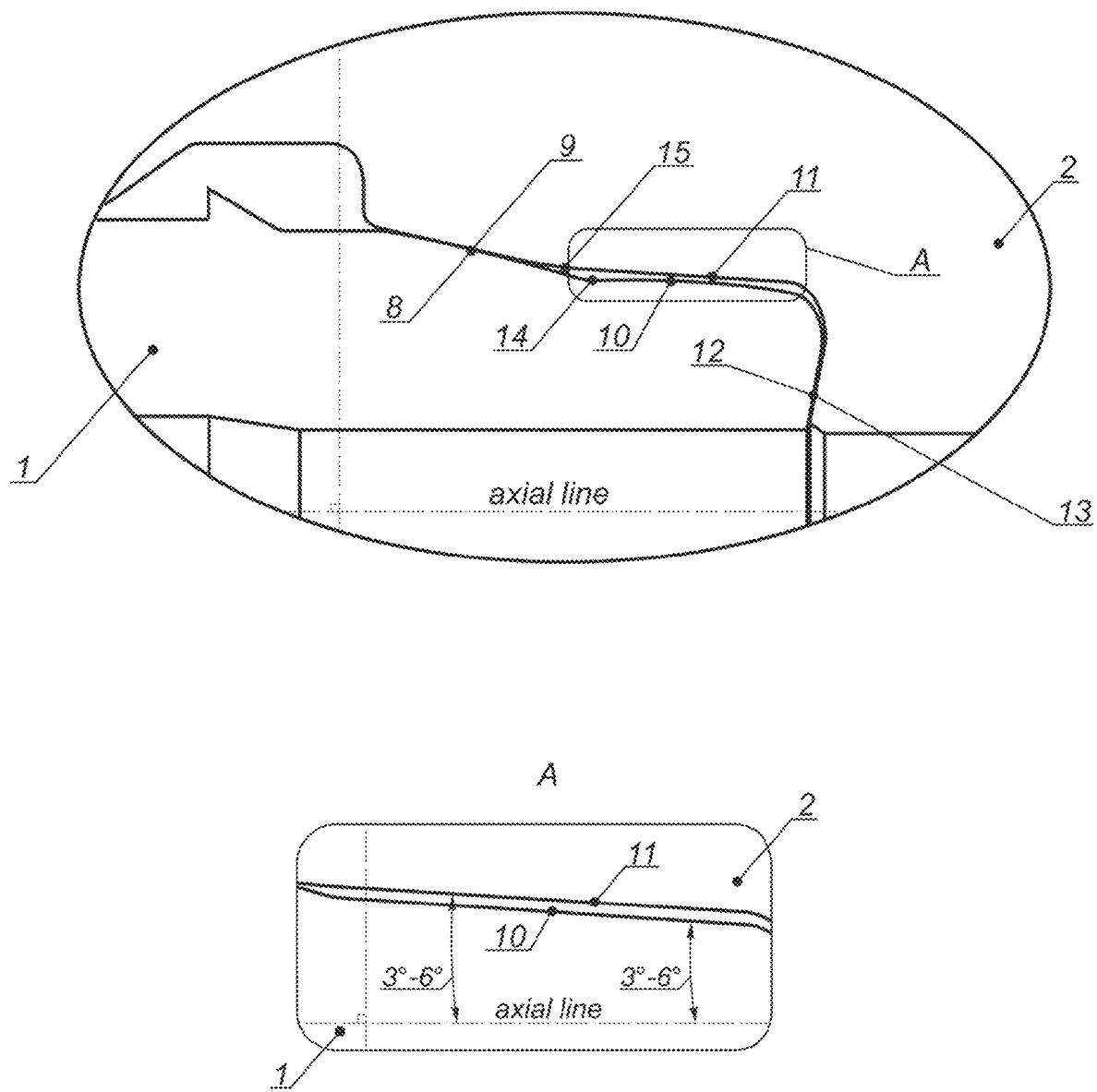
FIG. 3a shows an internal sealing unit of the claimed thread connection, including an enlarged partial view illustrating one optional configuration of additional surfaces.
Figure 3B:
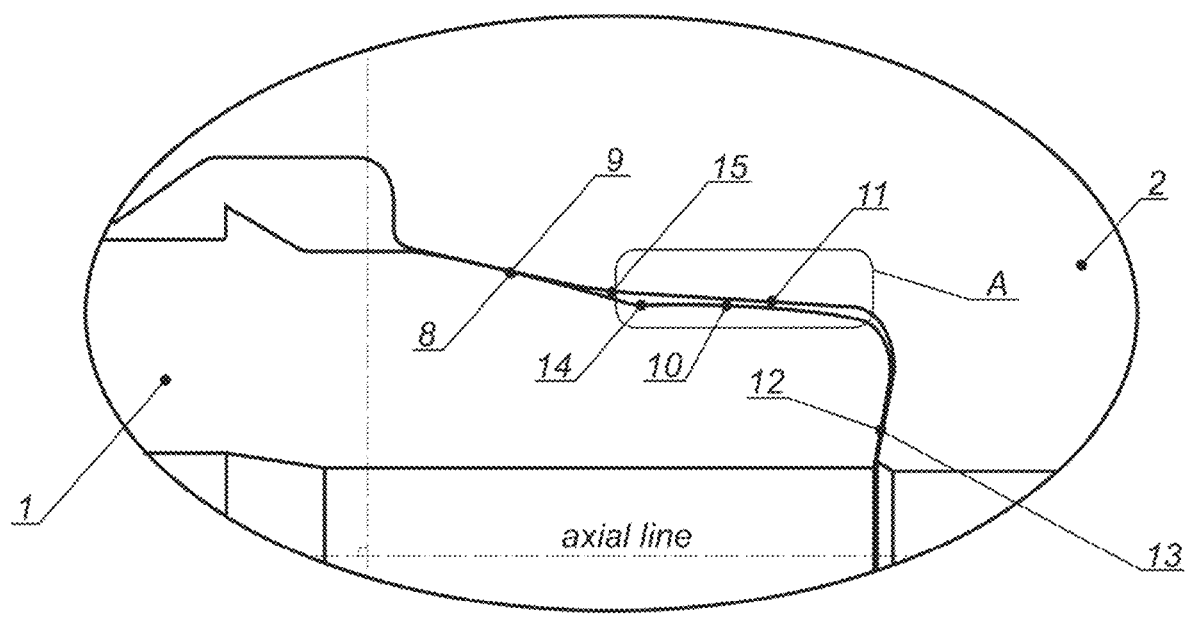
FIG. 3b shows an internal sealing unit of the claimed thread connection, including an enlarged partial view illustrating another optional configuration of additional surfaces.
Figure 3B:
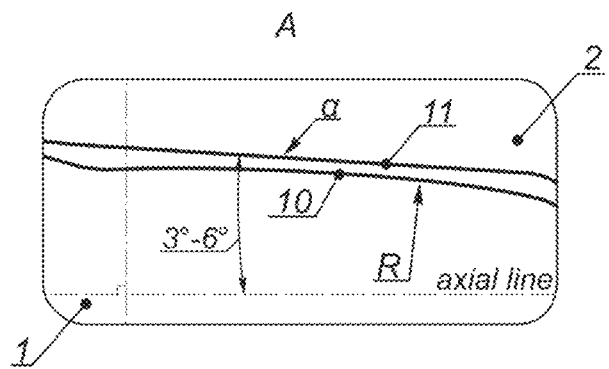

The claimed thread connection for casings consists of the male element (1), and the female element (2), the ends of which, both externally and internally, correspondingly, are produced with tapered trapezoidal threads (3).

The thread turn profile (3) is made in a form of unequal-sided trapezium, the sides of which are the load (4) flank and the stab (5) flank, having different slope angles to thread axis normal line.

When making-up the connection with such a thread the load flanks (4) of the thread turn profile (3) of the male element (1) and the female element (2) are in contact with each other and undertake axial tensile loads affecting the connection for casings. In other words, the contact of load flanks (4) of thread turn profile (3) on the male (1) and female (2) elements prevents from cross-threading (thread run out) (3) of male (1) and female elements (3) at limit tensile loads applied to the connection under the string run in to the well self-weight. Reduction of radial interference value in thread is also achieved, that provides for high wear resistance of the connection, improves its working efficiency at high loads.

When making-up the connection with the trapezoidal thread a structural gap appears on stab flanks (5) of thread turn profile (3), that provides for improved make-up of the connection-possibility of multiple make-up/break-out of the thread connection without damages (galling) of the contact surfaces of threads (3) and without loss of the performance characteristics of the connection, provides for prevention from jamming of the connection at the initial stage of make-up. The above said is achieved by means of stabilization of male (1) and female elements (2) position relative to each other at the initial stage of make-up.

The threads (3) on the male (1) and female elements (2) are produced in a tapered form, that on the one hand provides for high level of its tooth action when making-up and lets it to undertake high bending and tensile loads, affecting during operation of the connection, on the other hand—it preserves high characteristics of make-up of the connection, prevention from jamming of thread.

Crests (6) and roots (7) of thread turn profile (3) are performed parallel to axial line of thread, that excludes jamming of thread at the initial stage of make-up, provides a deep free entry of the male element (1) into the female element (2) during make-up, without damages (galling) of the crests (6) and roots (7) of the thread turn profile (3).

The above described profile of thread (3) of the claimed connection provides for 100% of its compression efficiency, prevents the connection from jamming, damages of its surfaces during make-up.

The claimed invention is produced with the internal sealing unit, which is formed by contacting sealing surfaces (8), (9) and shoulder end face surfaces (12), (13) on the male (1) and female (2) elements of the connection.

The presence of the internal sealing unit in the connection, sealing (8), (9) and shoulder end face surfaces (12), (13) of which in made-up state contact each other with sufficient contact stresses, with appearance of elastic strains and creation of a "metal-to-metal" sealing, provides for high tightness including gas tightness of the connection being affected by multidirectional mechanical combined loads in any combinations.

Besides that, contacting of shoulder end face surfaces (12), (13) provides for "contraction" and fixing of sealing surfaces (8), (9), creates resistance of the connection to compression loads. The accurate positioning of the male (1) element relative to the female (2) element, accurate fixing of the design value of interference and make-up torque during make-up of the connection are also provided—namely, improved make-up characteristics, possibility of inspection of the connection make-up are provided.

The additional surfaces (10), (11) are located between sealing (8), (9) and shoulder end face surfaces (12), (13).

The additional surfaces (10), (11) are produced in the form of taper surface on the female (2) element and of taper surface or convex spherical surface on the male (1) element.

During the make-up process of the claimed thread connection, upon interaction of the threads (3) of the male (1) and the female (2) elements, forwarding of the additional surfaces (10), (11) takes place, of the male (11) and the female (2) elements relative to each other and further their interaction (contacting). Thereafter sealing surfaces (8), (9) of the male (1) and the female (2) elements interact, due to the plastic strain of which a "metal-to-metal" sealing is created. In addition, in completely made-up state the additional surfaces (10), (11) of the male (1) and the female (2) elements do not contact each other, forming a gap.

Thereby, the additional surfaces (10), (11) in process of make-up of the connection, during transition from contact of threads (3) to contact of sealing surfaces (8), (9), undertake a part of contact stresses, thereby protecting sealing surfaces (8), (9), from damages (galling) during make-up of the connection.

The additional surfaces (10), (11) are produced in the form of taper surfaces on the male (1) and female (2) element provides for release a part of contact stresses from the sealing surfaces (8), (9) (for protecting sealing surfaces (8), (9).

The additional surfaces (10), (11) are produced in the form of taper surface on the female (2) element and of convex spherical surface on the male (1) element that on the one hand provides for optimal contact area of the additional surfaces (10), (11) during make-up of the connection and necessary stress level of the contacting additional surfaces (10), (11) needed for release a part of contact stresses from the sealing surfaces (8), (9) (for protecting sealing surfaces (8), (9)), on the other hand provides for optimal "soft" and smooth break of the additional surfaces (10), (11) after their contacting, without damages (galling) of the additional surfaces (10), (11).

Besides that, implementation of sealing surfaces (8), (9) at the distance from shoulder end face surfaces (12), (13), that is, removal of contact area of sealing surfaces (8), (9) from contact area of shoulder end face surfaces (12), (13), provides reduction of the interdependency tightness action of the sealing surfaces (8), (9) and shoulder end face surfaces (12), (13) and maximum tightness of the connection at any combinations of loads including gas tightness.

Transition from sealing surfaces (8), (9) to additional surfaces (10), (11) are produced in the form of concave spherical surface (14) on the male (1) element and of convex spherical surface (15) on the female (2) element.

During the make-up process of the claimed thread connection, after interaction of the threads (3) of the male (1) and the female (2) elements, forwarding of the sealing surfaces (8), (9) relative to each other, that starts with interaction of the transition surfaces—concave spherical surface (14) on the male (1) element and of convex spherical surface (15) on the female (2) element. The implementation of the transition surfaces (14), (15) as described above facilitates the forwarding of the sealing surfaces (8), (9) relative to each other at the first moments of contact, ensures the safety of the sealing surfaces (8), (9), their protecting from damages (galling) during make-up of the connection.

In addition, the convex spherical surface (15) on the female (2) element increases contact area of the sealing surfaces (8), (9) of the male (1) and the female (2) elements, which positively affects the tightness of the connection.

THE IMPLEMENTATION OF THE INVENTION

The claimed thread connection for casing works as follows.

Upon alignment of the male (1) and the female (2) elements relative to each other, the premier step at make-up process is to perform interaction of the male (1) and the female (2) elements by means of tapered trapezoidal threads (3), produced on the external surface of the male (1) element and internal surface of the female (2) element.

Further forwarding of the additional surfaces (10), (11) of the male (1) and the female (2) elements relative to each other takes place and their interaction (contacting).

Thereafter transition surfaces (14), (15) and sealing surfaces (8), (9) of the male (1) and the female (2) elements interact, due to the plastic strain of which a "metal-to-metal" sealing is created.

The specified transition from contact of additional surfaces (10), (11) to contact of sealing surfaces (8), (9) is displayed at the connection make-up diagram as a transition segment, is of the form of a leap towards reduction of make-up torque and its further increase.

The connection make-up process completion goes with power contact of the shoulder end face surfaces (12), (13), produced on the male (1) and female (2) elements which results in appearance of the contact stresses of the shoulder end face surfaces (12), (13), the values of which are within elastic strains range.

The additional surfaces (10), (11) in made-up state of the male (1) and the female (2) elements do not contact each other, forming a gap.

EXAMPLE OF IMPLEMENTATION OF THE INVENTION

To carry out testings of the claimed thread connection for casings the specimens (NoNo 1, 2, 3) were manufactured.

For specimen No. 1 the casing with the nominal diameter of 178 mm as a coupling blank was used. On outside surface of the male element and inside surface of the female element of specimen No. 1 trapezoidal tapered threads are produced with 1:12 taper, with the pitch of 8, 467 mm, with the slope angle of turn profile stub flank $15°$ and the slope angle of turn profile load flank $-5°$ to thread axis normal line. The crests and roots of the thread turn profile of the male and female elements are produced parallel to axial line of thread.

Internal sealing unit elements are formed: the sealing surfaces are produced in the form of convex spherical surface with the radius of 125 mm on the male element and tapered surface with the slope angle of $12°$ to thread axial line on the female element, the additional surfaces are produced in the form of convex spherical surface with the radius of 90 mm on the male element and tapered surface with the slope angle of $4°$ to thread axial line on the female element, shoulder end face surfaces are produced at an angle of $10°$ to thread axis normal line. Transition from sealing surfaces to additional surfaces are produced in the form of concave spherical surface with the radius of 3 mm on the male element and of convex spherical surface with the radius of 7 mm on the female element.

For specimen No. 2 the casing with the nominal diameter of 114 mm as a coupling blank was used. On outside surface of the male element and inside surface of the female element of specimen No. 2 trapezoidal tapered threads are produced with 1:18 taper, with the pitch of 5, 08 mm, with the slope angle of turn profile stub flank $15°$ and the slope angle of turn profile load flank $-5°$ to thread axis normal line. The crests and roots of the thread turn profile of the male and female elements are produced parallel to axial line of thread.

Internal sealing unit elements are formed: the sealing surfaces are produced tapered with the slope angle of $12°$ to thread axial line, the shoulder end face surfaces are produced at an angle of $10°$ to thread axis normal line, the additional surfaces are produced tapered with the slope angle of $4°$ to thread axial line. Transition from sealing surfaces to additional surfaces are produced in the form of concave spherical surface with the radius of 5 mm on the male element and of convex spherical surface with the radius of 7 mm on the female element.

Besides, specimen (No. 3) was manufactured, having geometric parameters of the closest analog—the casing with the nominal diameter of 178 mm as a coupling blank was used. On outside surface of the male element and inside surface of the female element of specimen No. 3 trapezoidal tapered threads are produced with 1:16 taper, with the pitch of 6, 35 mm, the slope angle of turn profile stub flank $15°$ and the slope angle of turn profile load flank $-5°$ to thread axis normal line.

Internal sealing unit elements are formed: the sealing surfaces are produced spherical; the shoulder end face surfaces are produced at an angle of $10°$ to thread axis normal line.

The testings of the specimens for make-up/break-out were carried out until the occurrence of the damage on thread surfaces and the internal seal assembly.

The testings of the specimens described above showed appearance of surface damages (gallings) after two cycles of make-up/break-out of specimen No. 3 of the closest analog, and absence of jamming and damages (gallings) on the surface after five cycles of make-up/break-out of specimen Nos. 1, 2 of the claimed invention.

The use of the proposed thread connection ensures the preservation of the tightness of the connection under an increase of 20% in the value of combined multidirectional mechanical loads.

The invention claimed is:

1. A thread connection for casings comprising:
   a male element (1) and female element (2) both having ends wherein, the ends both externally and internally, are produced correspondingly with tapered trapezoidal threads (3);
   sealing surfaces (8) and (9) and shoulder end face surfaces (12) and (13) collectively forming an internal sealing unit, wherein the tapered trapezoidal threads (3) each is characterized with a thread turn profile having crests (6) and roots (7) both produced parallel to an axial line of the tapered trapezoidal threads (3),
   said internal sealing unit is equipped with additional surfaces (10) and (11), located between said sealing surfaces (8) and (9) and said shoulder end face surfaces (12) and (13) correspondingly, wherein the additional surface (11) is produced in the form of a taper surface on the female element (2), the additional surface (10) is produced in the form of a taper surface or convex spherical surface on the male element (1), and a transition from the sealing surfaces (8) and (9) to the additional surfaces (10) and (11) are produced in the form of concave spherical surface (14) on the male element (1) and of convex spherical surface (15) on the female element (2).

2. The connection according to claim 1, wherein said trapezoidal threads (3) of the male element (1) and the female element (2) are produced with a 1:18 taper.

3. The connection according to claim 1, wherein said trapezoidal threads (3) of the male element (1) and the female element (2) are produced with a 1:12 taper.

4. The connection according to claim 1, wherein said trapezoidal threads (3) of the male element (1) and the female element (2) are produced with a 1:8 taper.

5. The connection according to claim 1, wherein said trapezoidal threads (3) of the male element (1) and the female element (2) are produced with a pitch of 8.467 mm.

6. The connection according to claim 1, wherein said trapezoidal threads (3) of the male element (1) and the female element (2) are produced with a pitch of 5.08 mm.

7. The connection according to claim 1, wherein
   said thread turn profile has a shape of unequal-sided trapezium, defining one lateral side thereof as a stab flank (5), said thread turn profile is characterized with a normal line being perpendicular to said axial line, and wherein:
   the stab flank (5) is produced with a slope angle of 13-17° to the normal line.

8. The connection according to claim 1, wherein
   said thread turn profile has a shape of unequal-sided trapezium, defining one lateral side thereof as a load flank (4), said thread turn profile is characterized with a normal line being perpendicular to said axial line, and wherein:
   the load flank (4) is produced with a slope angle from −3 to −7° to the normal line.

9. The connection according to claim 1, wherein
   said thread turn profile is characterized with a normal line being perpendicular to said axial line, and
   said shoulder end face surfaces (12) and (13) of the male element (1) and the female element (2) respectively are produced with an angle of 8-12° to the normal line.

10. The connection according to claim 1, wherein said sealing surfaces (8) and (9) of the male element (1) and the female element (2) are produced tapered with a slope angle of 11-14° to said axial line.

11. The connection according to claim 1, wherein the sealing surfaces (8) and (9) are produced in the form of convex spherical surface with a radius of 125-200 mm on the male element (1) and in the form of taper surface with a slope angle of 11-14° to said axial line on the female element (2).

12. The connection according to claim 1, wherein said thread turn profile has a shape of unequal-sided trapezium, defining one lateral side thereof as a stab flank (5), and a transition from the crest (6) to the stab flank (5) of the male element (1) and the female element (2) is produced in the form of complex surface consisted of two spherical surfaces, having different radii (R1) and (R2).

13. The connection according to claim 12, wherein
   the radius (R1) of a first spherical surface of said two spherical surfaces, adjacent to the crest (6) of the male element (1) and the female element (2) is produced equal to 0.2-0.5 mm, and the radius (R2) of a second spherical surface of said two spherical surfaces adjacent to the stab flank (5) of the male element (1) and the female element (2) is produced equal to 1.1-1.3 mm.

14. The connection according to claim 1, wherein the additional surfaces (10) and (11) are produced in the form of tapered surfaces with a slope angle of 3-6° to said axial line on the male element (1) and the female element (2).

15. The connection according to claim 1, wherein the additional surface (10) is produced only in the form of a convex spherical surface on the male element (1) and the additional surface (11) is produced in the form of a tapered surface on the female element (2).

16. The connection according to claim 15, wherein said additional surface (10) is produced with a radius of 90-100 mm, and said additional surface (11) is produced with a slope angle of 3-6° to said axial line.

17. The connection according to claim 1, wherein the concave spherical surface (14) between the sealing surface (8) and the additional surface (10) of the male element (1) is produced with a radius of 3-5 mm.

18. The connection according to claim 1, wherein the convex spherical surface (15) between the sealing surface (9) and the additional surface (11) of the female element (2) is produced with a radius of 6-8 mm.

* * * * *